United States Patent
Chibon et al.

(10) Patent No.: US 11,876,682 B2
(45) Date of Patent: *Jan. 16, 2024

(54) CONSENSUS-BASED NODE RETIREMENT PROCESS IN A MESH

(71) Applicant: Red Hat, Inc., Raleigh, NC (US)

(72) Inventors: Pierre-Yves Chibon, Paris la Defense (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,789

(22) Filed: Feb. 20, 2023

(65) Prior Publication Data

US 2023/0308356 A1    Sep. 28, 2023

Related U.S. Application Data

(63) Continuation of application No. 17/703,659, filed on Mar. 24, 2022, now Pat. No. 11,606,260.

(51) Int. Cl.
| | |
|---|---|
| *G06F 15/173* | (2006.01) |
| *H04L 41/12* | (2022.01) |
| *H04L 43/08* | (2022.01) |
| *H04L 41/0893* | (2022.01) |

(52) U.S. Cl.
CPC .......... *H04L 41/12* (2013.01); *H04L 41/0893* (2013.01); *H04L 43/08* (2013.01)

(58) Field of Classification Search
CPC ...... H04L 41/12; H04L 41/0893; H04L 43/08
See application file for complete search history.

(56) References Cited

U.S. PATENT DOCUMENTS

| | | | |
|---|---|---|---|
| 9,634,928 | B2 | 4/2017 | Choudhury et al. |
| 9,730,078 | B2 | 8/2017 | Nixon et al. |
| 9,942,824 | B2 | 4/2018 | Veillette |
| 10,158,539 | B2 | 12/2018 | Kim et al. |
| 10,805,984 | B2 | 10/2020 | Iyer et al. |
| 10,986,387 | B1 | 4/2021 | Parulkar et al. |

(Continued)

FOREIGN PATENT DOCUMENTS

EP    3565218 A1    11/2019

OTHER PUBLICATIONS

Extended European Search Report dated May 16, 2023 (May 16, 2023), EP Application No. 22192338.6, pp. 1-8.

*Primary Examiner* — Wing F Chan
*Assistant Examiner* — Joseph R Maniwang
(74) *Attorney, Agent, or Firm* — K&L Gates LLP

(57) ABSTRACT

Systems and methods are disclosed for a consensus-based node retirement in a mesh network. An example system includes: a mesh network comprising a plurality of nodes, including a first node, a second node, and a mesh controller; a processor; and memory. The memory may store instructions that, when executed by the one or more processors, may cause the mesh controller to: distribute a mesh membership contract to the mesh network, the mesh membership contract comprising membership rules; receive, from the first node, based on a performance status of the second node, an identification of a deficiency in a performance metric of the second node, wherein the deficiency is based on a failure of the second node to satisfy a membership rule; and remove, after a consensus by the mesh network for the identified deficiency, one or more capabilities of the second node from the mesh network.

20 Claims, 5 Drawing Sheets

(56) References Cited

U.S. PATENT DOCUMENTS

| | | |
|---|---|---|
| 11,190,391 B1 | 11/2021 | Joshi et al. |
| 2016/0105359 A1 | 4/2016 | Kim et al. |
| 2018/0302270 A1 | 10/2018 | Schreter |
| 2019/0235979 A1 | 8/2019 | Li et al. |
| 2020/0167319 A1 | 5/2020 | Fritz et al. |

CONSENSUS-BASED NODE RETIREMENT PROCESS IN A MESH

CROSS-REFERENCE TO RELATED APPLICATIONS

This application is a continuation of U.S. patent application Ser. No. 17/703,659, entitled "CONSENSUS-BASED NODE RETIREMENT PROCESS IN A MESH," filed Mar. 24, 2022, the entire contents of which are incorporated herein by reference herein and relied upon.

BACKGROUND

A mesh or a mesh network may comprise a plurality of nodes representing diverse devices. In some meshes or mesh networks, the nodes may connect directly, dynamically, and/or non-hierarchically with other nodes, and may cooperate with one another to efficiently route data. Mesh networks may dynamically self-organize and self-configure (e.g., by designating, based on a consensus, one node as a node controller). A mesh may expand over time as new nodes (e.g., new devices) are added to the mesh network. A performance of a new node may likely be superior to older nodes that have been in the mesh for a longer time. Performance metrics for measuring a performance of a node may include, for example, an availability, a response time, a processing speed, a channel capacity, a latency, a bandwidth, a throughput, a scalability, a power consumption, a storage capacity, a data compression, an environmental impact, and/or a software compatibility. The performance of a mesh may be determined by the performance of the weakest node of the mesh network.

SUMMARY

The present disclosure provides new and innovative systems and methods for a consensus-based node retirement in a mesh network. In an example, a system may include a mesh network comprising a plurality of nodes, including a first node, a second node, and a mesh controller. The system further includes (e.g., as part of a mesh server, a given node, and/or each node) one or more processors and memory. The memory may store instructions that, when executed by the one or more processors, may cause the first node to send, to the second node, a request for a performance status. The first node may receive, from the second node, a response to the request for the performance status. Based on the response to the request for the performance status, the first node may identify a deficiency in a performance metric of the second node. The deficiency may be based on a failure of the performance metric of the second node to satisfy a first membership rule of a mesh membership contract. Moreover, the mesh membership contract may be accessible to the plurality of nodes. After a consensus by the mesh network for the identified deficiency in the performance metric of the second node, the first node may cause a removal of one or more capabilities of the second node from the mesh network.

For example, the first node may report, to at least a portion of the plurality of nodes, the response to the request and the identified deficiency in the performance metric of the second node. The portion of the plurality of nodes may be prompted to approve the identified deficiency in the performance metric of the second node. The instructions, when executed, may cause the mesh controller to identify, based on an approval by at least the portion of the plurality of nodes on the identified deficiency in the performance metric of the second node, the consensus on the deficiency in the performance metric of the second node. Based on the deficiency, the mesh controller may remove, via a node retirement application associated with the mesh controller, one or more capabilities of the second node from the mesh network.

In another example, a method may include: sending, by a first node of a mesh network to a second node of the mesh network, a request for a performance status. The mesh network comprises a plurality of nodes including the first node, the second node, and a mesh controller. The first node may receive, from the second node, a response to the request for the performance status. The first node may identify, based on the response to the request for the performance status, a deficiency in a performance metric of the second node. The deficiency may be based on a failure of the performance metric of the second node to satisfy a first membership rule of a mesh membership contract. The mesh membership contract may be accessible to the plurality of nodes of the mesh network. For example, in at least one embodiment, prior to identifying the deficiency in the performance metric, the plurality of nodes of the mesh network may have received the mesh membership contract. In some aspects, a node retirement service application associated with the mesh controller may generate the mesh membership contract; and the mesh controller may cause a distribution of the mesh membership contract among the plurality of nodes of the mesh network. The mesh membership contract may comprise a plurality of membership rules including at least the first membership rule. The method may further include causing, after a consensus by the mesh network for the identified deficiency in the performance metric of the second node, a removal of one or more capabilities of the second node from the mesh network.

In some embodiments, the method may further include receiving, by the mesh controller, a proposal to modify the mesh membership contract. For example, the mesh controller may identify a consensus from at least a second portion of the plurality of nodes of the mesh network to modify the mesh membership contract. Based on the proposal, the mesh controller may cause an update to the mesh membership contract via the node retirement service application.

In another example, a non-transitory computer-readable medium is disclosed for use on a computer system containing computer-executable programming instructions for performing one or more steps, methods, and/or processes described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
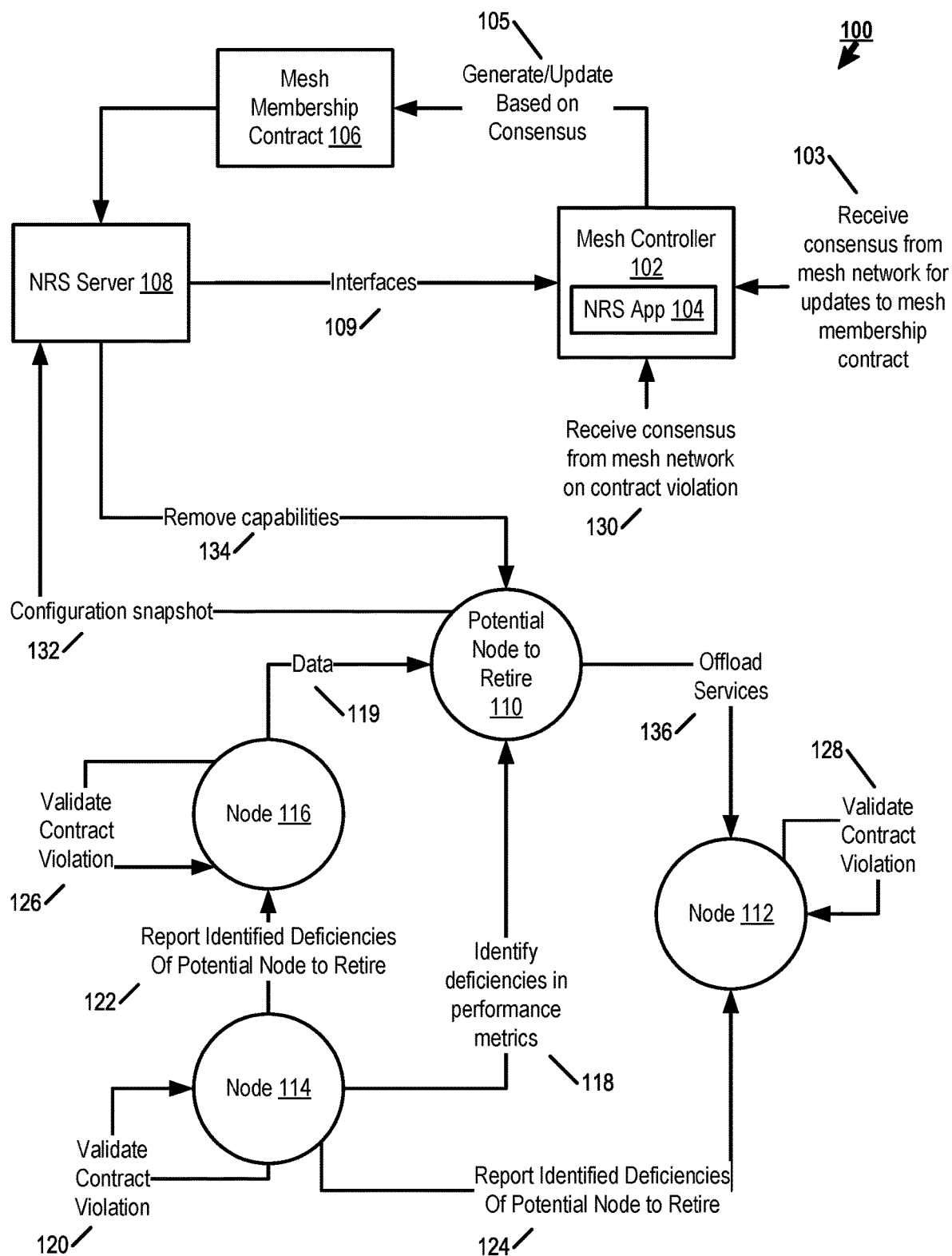
FIG. 1 illustrates a flow diagram of example processes for consensus-based node retirement in a mesh network, according to an example embodiment of the present disclosure.

A mesh network may comprise a plurality of nodes representing a diversity of devices. New nodes (e.g., new devices) may be added to a mesh network. A performance of a new node may likely be superior to older nodes that have been in the mesh for a longer time. However, the performance of a mesh may only be as strong as the performance of the weakest node of the mesh network. For example, in a mesh network for a distributed storage system (e.g., where each node may represent a storage device), a node that still runs an old spin disk type of hard-drive may perform much slower than newer nodes running the latest versions of SSD drives. Thus, as time passes, the diversity of performance profiles in a mesh network may become a challenge to the overall performance of the mesh network. There is thus a need for systems and methods for improving and/or efficiently maintaining optimal performance of mesh networks. Furthermore, there is a desire for reliable and self-governing systems and methods for eliminating, or reducing the use of, weaker nodes from a mesh network, in order to improve or efficiently maintain optimal performance of a mesh network.

Various embodiments of the present disclosure describe systems and methods for a consensus-based node retirement in a mesh network. Such systems and methods may address one or more of the shortcomings of mesh networks described above. For example, various embodiments of the present disclosure describe a mesh network having a node retirement service (NRS) that may facilitate the elimination or use reduction of weaker nodes in the mesh network, to improve or maintain an optimal strength for the mesh network. The NRS may sit within the mesh and may interface with a mesh controller. The mesh controller may comprise a server, a master node, and/or one of a plurality of nodes that has been designated (e.g., via a consensus process) as the mesh controller. The NRS may manage and/or receive a mesh membership contract. The mesh membership contract may be a rules engine that is dynamically editable by the mesh controller. The mesh membership contract may set forth one or more rules concerning device performance metrics. The rules may define the minimum requirements for a node of the mesh network to be considered a valid and active node within the mesh. Performance metrics governed by the rules may be based on a version of a firmware represented by the node, a performance capability of the device represented by the node, an age of the device represented by the node, a risk profile for the node, or any other variable that a sensible system administrator may use to decide membership to the mesh network. Non-compliance to such rules for performance metrics may be used to eliminate and/or reduce a use of a deficient node, and thereby improve or maintain the strength of a mesh network.

Various embodiments of the present disclosure also describe reliable (e.g., consensus-based) and self-governing (e.g., self-checking) techniques for the elimination or use reduction of the weaker nodes. For example, in various embodiments described herein, most or every member of a mesh network may have access to, and visibility of, the mesh membership contract. Devices representing such nodes may actively monitor each other within the mesh network to assess the performance of their neighboring nodes and/or compliance of the neighboring nodes to various membership rules of the mesh membership contract. The monitoring device representing a given node (e.g., a first node) may ascertain if another node (e.g., a second node) fails to comply with membership rules of a mesh membership contract (e.g., by checking whether the node being monitored is underperforming and/or having compatibility issues), thereby allowing members of the mesh network to self-regulate.

The quantitative or qualitative values, characteristics, or specifications for assessing compliance to the membership rules may be referred to as device parameters, for ease of explanation. The device parameters may include performance metrics and configuration parameters. The membership rules may include performance based rules (e.g., requiring performance metrics) and non-performance based rules (e.g., requiring configuration parameters and/or ability to transmit specific data and/or metadata). The performance-based rules may include, for example, requisite performance metrics (e.g., values) for various capabilities (e.g., ability to store, function as a communication beacon, or function as a server). The non-performance rules may include, for example, configuration parameters (e.g., whether a device represented by a node has requisite hardware) or whether it is able to receive or transmit specific data or metadata.

In some aspects, a device representing a node may self-monitor itself to determine whether the device parameters (e.g., performance metrics, configuration parameters, etc.) of the device comply with the membership rules (e.g., performance-based rules or non-performance-based rules) of the mesh membership contract.

If a node, whether by self-monitoring or by being monitored, is found to not comply with a membership rule (e.g., a performance-based rule), and is therefore a deficient node, the monitoring node can propose to the overall mesh that the deficient node it is interacting with is potentially in breach of the mesh membership contract (e.g., based on non-compliance to the performance-based rule). The NRS may ask other nodes of the mesh network to decide whether to validate the proposal made by the monitoring node (e.g., by submitting a vote (e.g., of an approval or a disapproval)). If validated by a threshold number of nodes, the deficient node may be removed from the mesh network. Also or alternatively, one or more functions or components may be removed from use by the mesh network. By providing other node members the power to validate a determination that a node is deficient, the decision to identify and remove a deficient node may be more reliable. Furthermore, by having each node self-regulate one another and/or self-monitor for compliance to membership rules, the present disclosure provides a more decentralized, and self-governing technique for strengthening and/or maintaining the robustness of a mesh network.

FIG. 1 illustrates a flow diagram of example processes 100 for consensus-based node retirement in a mesh network, according to an example embodiment of the present disclosure. Processes 100 may involve a plurality of systems, devices, clients, and/or nodes interacting with one another as will be described herein. Such systems, devices, clients, and/or nodes may include a mesh controller 102, an NRS server 108, and a plurality of nodes (e.g., nodes 110-116) that may include at least one node that may potentially retire from the mesh network or have its services reduced from the mesh network (e.g., potential node to be retired 110). As will be described in relation to FIG. 5, the mesh controller 102, the NRS server 108, and each of the plurality of nodes 110-116 may comprise a system, a server, a client device, and/or a storage device comprising a processor and a memory.

In at least one embodiment, the mesh controller 102 may comprise a node of the mesh network that has been preconfigured or designated (e.g., by consensus) to become a mesh controller. For example, a node may be designated as a mesh controller based on its favorable performance metrics, or by virtue of being the initial (e.g., starting) node in the mesh network before other nodes were added. In other aspects, the node may be preconfigured as a mesh controller (e.g., based on user input). In further embodiments, the mesh controller may be separate from the nodes of a mesh network, and/or may be a part of a separate network.

The NRS server 108 may comprise one or more servers or computing systems that host, manage, or facilitate a node retirement service application 104. For example, the NRS server may provide the mesh controller 102 with one or more interfaces 109 to node retirement options and functions via the NRS app 104. The mesh controller 102 may access and use the NRS application 104 to perform one or more node retirement processes described herein. Furthermore, the NRS server 108 may receive a mesh membership contract 106 that the NRS server 108 may store or use to conduct node retirement processes described herein. In some embodiments, the mesh controller 102 may be communicatively linked to, form a part of, or comprise the NRS server 108.

Referring to FIG. 1, the mesh controller 102 may manage the terms for membership (e.g., of new nodes) to the mesh network. For example, the mesh network 102 may generate the mesh membership contract 106 comprising the terms (e.g., as shown in process flow 105). These terms may also implicate, for example, when a node of the mesh network should be retired based on a non-compliance with a term. In some aspects, the terms may be updated based on a consensus by a threshold number of nodes of the mesh network. For example, one node of the mesh network may propose to change a term (e.g., a performance rule concerning a performance metric) of the mesh membership contract. The proposal to change the term may be distributed to other nodes of the mesh network for validation (e.g., an approval or a disapproval). If approved, the mesh controller 102 may receive a consensus from the mesh network (e.g., the threshold number of nodes) for an update to the mesh membership contract in accordance with the proposal (e.g., as shown in process flow 103). Thereafter, the mesh controller 102 may cause an update to the mesh membership contract 106 (process flow 105). In some aspects, the mesh controller 102 may cause the update via NRS application 104.

The mesh controller 102 may also facilitate the consensus-based retirement process driven by one or more of the plurality of nodes of the mesh network. For example, after a mesh membership contract 106 has been generated and/or updated (e.g., as shown in process flow 105), the mesh membership contract 106 may be distributed to, or be accessible to, each of the plurality of nodes of the mesh membership contract. Each node may monitor one another to assess the performance of one another. For example, node 114 (monitoring node) may monitor node 110 to determine whether node 110 complies with one or more membership rules of the mesh membership contract. In some aspects, a node may monitor itself to determine whether it complies with the membership rules of the mesh membership contract. If a node, whether by self-monitoring or by being monitored, is found to not comply with a membership rule, and is therefore a deficient node, the monitoring node can propose to the overall mesh that the deficient node it is interacting with is potentially in breach of the mesh membership contract (e.g., based on non-compliance to a performance-based rule).

For example, as shown in FIG. 1, node 114 may identify deficiencies in one or more performance metrics in node 110 (e.g., as shown in process flow 118). Thus, node 114 may identify node 110 as potentially violating the mesh membership contract 106, as the mesh membership contract comprises performance rules requiring attainment of the one or more performance metrics, which node 110 does not meet. Node 110 may be deemed (e.g., by node 114) as a potential node to retire. The identified deficiencies in the performance metrics of node 110 may be reported to the other nodes (e.g., as shown in process flows 122 and 124). In some aspects, the other nodes may be presented with the software and/or hardware capabilities of the allegedly deficient node and the rules allegedly being violated. Node 114 may then request or cause (e.g., via the mesh controller) other nodes of the mesh contract to validate (e.g., approve or disapprove) the finding by node 114 that node 110 violates the mesh membership contract. Also or alternatively, the NRS server or the mesh controller may ask the other nodes of the mesh network to decide whether to validate the finding made by node 114 that node 110 is violating the mesh membership contract (e.g., by submitting a vote (e.g., of an approval or a disapproval)). Each of the other nodes may thus perform a validation process to determine whether or not node 110 is violating the membership contract (e.g., as shown in process flows 120, 126, and 128). For example, each node may compare a membership rule of the contract alleged as being violated, and the reported deficiency of node 110.

If the membership rule that is alleged to be violated by node 110 is solely based on performance (e.g., a performance-based rule), a validation of the contract violation may be based on a vote by a validating node (e.g., in an election manner). The vote may indicate whether or not the validating node deems that node 110 has violated the mesh membership contract and (thus) should retire. As used herein, retiring may refer to a node (e.g., node 110) being eliminated from a mesh network, or having one or more functions, capabilities, or services being removed from use by the mesh network. The votes by the nodes may be received (e.g., as a consensus) by the mesh controller 102 (e.g., as shown in process flow 130). A threshold for passing the validation may be based on a percentage of nodes that vote in favor for validating the contract violation. The threshold may be configurable within the NRS server 108.

If the rule that is alleged to be violated by node 110 has more complex requirements (e.g., the membership rule is a non-performance based rule), the mesh controller 102 and/or NRS server 108 may take ownership of handling the request to validate the contract violation. For example, the membership rule may be based on a metadata associated with the potentially violating node, but that metadata may only be accessible to the mesh controller. In some embodiments, a configuration snapshot of the allegedly deficient node 110 may be presented to the NRS server 108 (e.g., as shown in process flow 132) or the mesh controller 102. The NRS server 108 and/or mesh controller 102 may determine if one or more membership rules of the mesh membership contract 106 has been violated by node 110.

If the mesh controller 102 has deemed that a node (e.g., node 110) has breached a membership rule of the mesh membership contract 106, or has received a threshold consensus from nodes of the mesh network for the contract violation by the node, the node may be eligible for retirement. In some aspects, the deficient node, shown as node 110 in FIG. 1, may be removed from the mesh network. For example, the device representing node 110 may no longer be used or be accessible by the rest of the nodes of the mesh network to perform processes associated with the mesh network.

However, in some embodiments, deficient or retiring nodes may not suffer a hard retirement. For example, if the retiring node 110 provides a plurality of services of which one service or capability has been deemed deficient, the NRS server 108 and/or the mesh controller 102 may be able to work with other non-deficient services or capabilities of the retiring node 110, such as a data preservation service, or a service failover capability. The services or capabilities that the retiring node 110 is deemed to be deficient at performing may be offloaded to another node (e.g., node 112) (e.g., as shown by process flow 136). For example, the retiring node 110 may have functioned as a data storage of the mesh network, storing data 119 of other nodes (e.g., node 116). The retirement may involve offloading the data storage capability to another node (e.g., node 112). This softer retirement of the deficient node can help ensure that device functionalities and data are preserved within the mesh. For example, a node's hard drive performance may be deemed as poor and thus a cause for retirement for storage based functions, even though the node may continue to server communication functions as a communication beacon. In some embodiments, a retiring node's deficient capability or service may not be offloaded until another node that is capable of being able to perform that capability or service is secured. Until such node is secured, the retiring node may perform that capability, at least deficiently, e.g., to avoid a complete shutdown of that capability from the mesh network.

During or after retirement, the NRS server 108 may create (e.g., via GITHUB-based commands) a final configuration backup of the Node (e.g., by receiving a configuration snapshot 132 of the retiring node 110), in case the retiring node 110 is needed at a later stage. The NRS server 108 may initiate a wipe and shutdown of the retiring node 110, and/or may allow the mesh controller 102 to remove the node 110.

Figure 2:
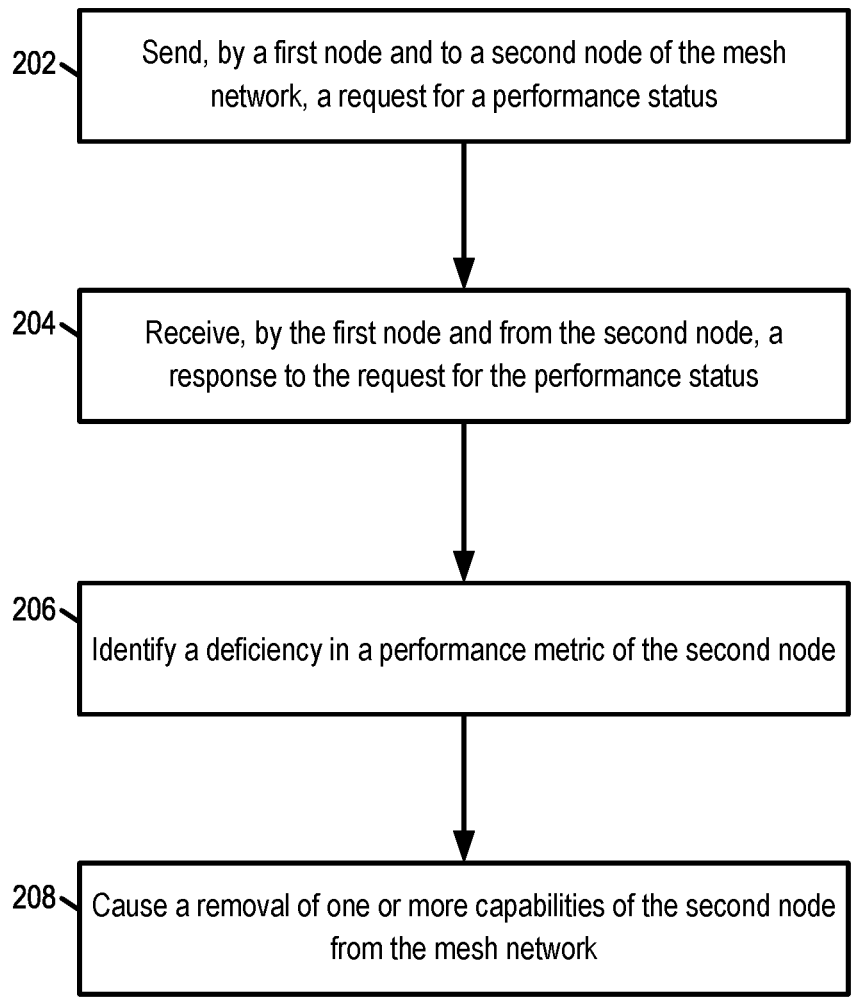
FIG. 2 illustrates a flowchart of an example process for a consensus-based node retirement in a mesh network, according to an example embodiment of the present disclosure.

FIG. 2 illustrates a flowchart of an example process 200 for a consensus-based node retirement in a mesh network, according to an example embodiment of the present disclosure. One or more steps of example process 200 may performed by a node (e.g., a first node) of the plurality of nodes of a mesh network. For example, one or more steps may be performed by node 114, as discussed in FIG. 1. In some aspects, one or more steps may be performed by a mesh controller (e.g., mesh controller 102), which may itself be a node of the mesh network.

Process 200 may begin with a first node sending a request for a performance status to a second node (block 202). The second node may be another node in the mesh network (e.g., node 110 of FIG. 1). The request for a performance status may be a part of the routine monitoring by nodes of one another for compliance to the mesh membership contract (e.g., mesh membership contract 106), as described previously in relation to FIG. 1. Each node may store and/or have access to the mesh membership contract. In some aspects, the mesh membership contract may comprise a plurality of membership rules. The membership rules may include performance-based rules, which may typically be used for nodes to assess one another, non-performance based rules, which may typically be used for nodes to self-check or for a mesh controller to assess a node. The performance based rules of the mesh membership contract may require a node device to satisfy a predetermined threshold of a performance metric associated with the performance rule. Performance metrics for measuring a performance of a node may include, for example, an availability, a response time, a processing speed, a channel capacity, a latency, a bandwidth, a throughput, a scalability, a power consumption, a storage capacity, a data compression, an environmental impact, and/or a software compatibility. Although the performance rules may require a device to fulfill a performance metric, the mesh membership contract and/or a performance rule may also require fulfillment of criteria not related to a performance, or not verifiable by all nodes (e.g., metadata). In such cases, as will be described herein, the mesh controller may be involved in verifying whether a given node complies with the mesh membership contract.

At block 204, the first node may receive, from the second node, a response to the request for the performance status. For example, the sending of the request may cause the second node to generate a report displaying its current performance metrics for the various performance rules of the mesh membership contract. In some aspects, the report may also display configuration parameters (e.g., hardware specifications and non-performance-based metrics) associated with the device representing the second node. The second node may send this report to the first node. In some aspects, if a performance rule or non-performance rule requires compliance to a criteria that is not accessible to or intended to be visible to the first node, the second node may indicate that accordingly. For example, an example performance status may indicate compliance with two of four membership rules (e.g., two performance-based rules), a non-compliance with one of the four membership rules (e.g., one performance-based rule), and an indication that the compliance status of the remaining rule of the four membership rules (e.g., a non-performance-based rule) may not be available or accessible to the first node.

At block 206, a deficiency in a performance metric of the second node may be identified. The identification may be performed by the first node, one or more other nodes (e.g., to verify an initial identification by the first node), and/or by a mesh controller (e.g., in order to determine compliance status for rules that may not be visible or accessible to all nodes). For example, the first node may review the performance metrics measured by the second node, compare them with threshold performance metrics required by each performance rule of the mesh membership contract, and identify if the second node fails to comply with (i.e., is deficient in) any performance rule. After a first node has identified a deficiency, the performance report of the second node may be distributed to other nodes for the other nodes to validate the first node's finding that the second node is deficient in one or more performance rules of the mesh membership contract (i.e., the second node violates the mesh membership contract). The validation may involve the other nodes also identifying the deficiency in the performance metric of the second node. Furthermore, the validation may involve a vote (e.g., an approval or a disapproval) of the finding by the first node that the second node is deficient in the performance metric of the performance rule.

If a threshold number of the other nodes have validated the finding of the first node that the second node is deficient in a performance metric of a performance rule and is thus violating the mesh membership contract, a mesh controller may deem that there is a consensus that the second node is violating the mesh membership contract. Thereafter, the mesh controller may cause a removal of one or more capabilities of the second node from the mesh network (block 208). For example, as will be described further in relation to FIG. 3, the capabilities associated with the deficient performance metric may be removed from being of service to the mesh network.

Figure 3:
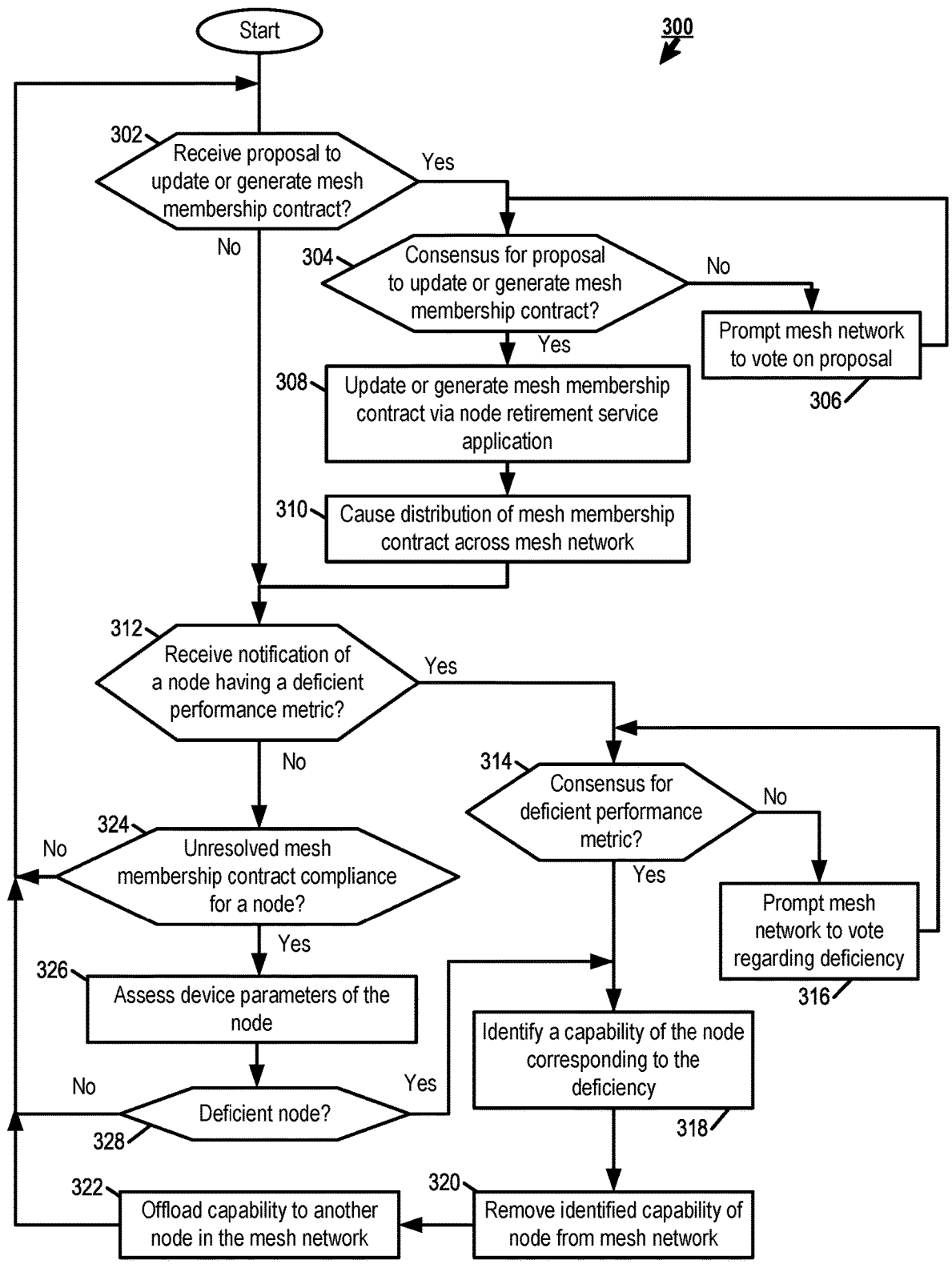
FIG. 3 illustrates a flowchart of another example process performed by a mesh controller to facilitate consensus-based node retirement, according to an example embodiment of the present disclosure.

FIG. 3 illustrates a flowchart of another example process 300 performed by a mesh controller (e.g., mesh controller 102) to facilitate consensus-based node retirement, according to an example embodiment of the present disclosure. Process 300 may comprise one or more iterative monitoring loops that may culminate in the generating, updating, and/or distributing of a mesh membership contract (e.g., blocks 302 through 310) or the addressing and retiring one or more notes having a deficient performance metric (e.g., blocks 312 through 328).

With respect to generating, updating, and/or distributing a mesh membership contract, the mesh controller may continuously and/or periodically monitor proposals for updating a mesh membership contract, or generating a mesh membership contract (e.g., at the beginning of the evolution of a mesh network). For example, at block 302, the mesh controller may determine whether it has received a proposal to update or generate a mesh membership contract. The proposal to update may be received, for example, from another node. Also or alternatively, the proposal may be received from an operator (e.g., user via user input) of the mesh network, e.g., in order to advance to purposes for which the mesh network was built. If concerning an update to a mesh membership contract, the proposal may involve a change to a device parameter of a membership rule of the mesh membership contract (e.g., an adjustment to a threshold performance metric required for a performance rule). Also or alternatively, the proposal may involve the addition, deletion, or an update to a performance rule or non-performance based rule to the mesh membership contract. If concerning a generation of the mesh membership contract, the proposal may involve a set of performance rules and threshold performance metrics required for each performance rule to be used for the mesh membership contract.

If a proposal has been received, the mesh controller may determine whether there is a consensus for the proposal (block 304). For example, if the proposal was received from a node of the mesh network, where the mesh network comprises a plurality of nodes, the mesh controller may check to see if a threshold number (e.g., majority) of the nodes of mesh network approve the proposal. A consensus for a mesh membership comprising a single node (e.g., at the start of an evolution of a mesh network) may involve consensus from just that node.

If a consensus has not yet been received, the mesh controller may prompt the mesh network to vote on (e.g., approve or disapprove) the proposal (block 306). After votes are received from the plurality of nodes comprising the mesh network, the mesh controller may reassess whether a consensus is received (block 304).

If the consensus is received, the mesh controller may update or generate the mesh membership contract via a node retirement service (NRS) application (e.g., NRS app 104 of mesh controller 102) (block 308). For example, the mesh controller may interface and cause a server managing the NRS application (e.g., NRS server 108) to generate or update the mesh membership contrast as per instructions provided by the proposal. In some aspects, a master copy of the mesh membership contract may be stored at the server. The mesh controller and/or the server may then cause a distribution of the mesh membership contract across the mesh network (block 310). Thereafter, each node of the mesh network may have a copy of the generated or updated mesh membership contract. Also or alternatively, each node may be able to access the generated and/or updated mesh membership contract stored at the NRS server.

The mesh membership contract, which may comprise one or more rules (e.g., performance based rules concerning required performance metrics and non-performance based rules concerning configuration parameters, the ability to send specific types of data and other metrics), may be used by the nodes to actively monitor one another or oneself to assess compliance with the mesh membership contract. If a monitored node is found to be deficient in the fulfillment of a membership rule (e.g., is deficient in a performance metric required by a performance-based rule of the mesh membership contract), the monitored node may be reported (e.g., by a node monitoring the monitored node). Also or alternatively, a monitored node can be reported if the monitored node is found to have an unresolved mesh membership contract compliance (i.e., the monitoring node is not able to determine whether the monitored node complies with a specific membership rule (e.g., non-performance based rule). The mesh controller may periodically check to see if it has received such reports from the one or more nodes from the mesh network.

For example, at block 312, the mesh controller may determine whether it has received a notification of a node having a deficient performance metric. If the mesh controller has received the notification, the mesh controller may determine whether there is a consensus (e.g., among the mesh network) for the node having the deficient performance metric (block 314). For example, the mesh controller may check to see if a threshold number (e.g., majority) of the nodes of the mesh network approve the finding that the monitored node has a deficient performance metric concerning a performance rule of the mesh membership contract. If the mesh controller has not received a consensus yet, the other nodes may be prompted (e.g., by transmitting a request) to vote for an approval or disapproval regarding the identified deficiency (block 316). The approval or disapproval may be determined by the vote cast by each node and received by the mesh controller. Furthermore, each node may store, or have access to the updated or generated mesh membership contract, and may also receive a report of the performance metrics of the node having the allegedly deficient performance metric. Each node may compare the reported performance metrics with the threshold performance metrics required by one or more performance rules of the mesh membership contract to determine whether there is a deficient performance metric. Based on the votes received, the mesh controller may thus determine whether there is a consensus for the deficient performance metric (block 314).

If there is a consensus, the node having the deficient performance metric may be a violating node as that node had been determined (e.g., via consensus by the mesh network) to violate a term (e.g., a performance rule) of the mesh membership contract. The mesh controller may identify a capability of the violating node that corresponds to the deficiency (e.g., a deficient performance metric) of the violating node (block 318). Each node of a mesh network may provide a capability to further the purpose of the mesh network. These capabilities may include but are not limited to a storage for the mesh network, a communication beacon for the mesh network, or a backup server for the mesh network. A performance rule and/or a performance metric may correspond to each capability. For example, performance metrics for a storage capacity, a data compression rate, or a scalability of the node may correspond to a capability of the node as a storage for the mesh network. Performance metrics for a channel capacity, an availability, a response time, a latency, a bandwidth, or a throughput of the node may correspond to a capability of the node as a communication beacon for the mesh network. Performance metrics for a processing speed, an availability, a response time, a scalability, an environmental impact, or a software compatibility may correspond to a capability of the node as a backup server for the mesh network.

The identified capability of the node may be removed from the mesh network (block 320). Thus, if a node is found to have a performance metric that is deficient and fails to comply with a performance rule for the mesh membership contract, the capability corresponding to the performance metric may be removed. For example, a node having a storage capacity that is below a required threshold may be removed from serving as a storage for the mesh network. In some aspects, the removal may be performed by the NRS server 108. The mesh network may continue to use retiring the node for other capabilities for which the node is not deficient in their corresponding performance metrics. However, if the node is deficient in performance metrics corresponding to all or a significant proportion of capabilities, the node may be retired entirely.

The retired capability or capabilities of the node may be offloaded to another node in the mesh network (block 322). For example, the NRS server 108 may broadcast a message to all nodes to relay, to another node, all communication originally intended to be sent to the retiring node for the capability to be removed. In one embodiment, the said another node may be determined by identifying a node, among the mesh network, that is best poised (e.g., has the most optimal performance metric) to deliver the capability to be retired from the deficient node. In another embodiment, the said another node may be determined based on a sequential or randomized selection of a node among the mesh network that is not deficient in the capability. Thereafter the mesh controller may continue performing the above described iterative monitoring processes (e.g., blocks 302 through 322).

In some embodiments, a retiring node's deficient capability or service may not be offloaded until another node that is capable of being able to perform that capability or service is secured. Until such node is secured, the retiring node may perform that capability, at least deficiently, e.g., to avoid a complete shutdown of that capability from the mesh network.

It is contemplated that some nodes of the mesh network, in the process of actively monitoring one another for compliance to the mesh membership contract, may not be able to assess compliance by a monitored node to the mesh membership contract. For example, the mesh membership contract may have non-performance based rules (e.g., required configuration parameters) for nodes. Such non-performance based rules (e.g., configuration parameters) may involve, for example, requirements for a node to possess a specific hardware or to transmit metadata that may not be accessible or decipherable by a monitoring node. In some aspects, monitoring nodes may not be able to assess compliance by a monitored node to a performance-based rule. For example, nodes being used in the mesh network for providing a certain capability may generate performance metrics that may not be readable or recognizable to monitoring nodes that do not have (e.g., are not being used by the mesh network for) that capability.

A monitoring node may report (e.g., by transmitting) to the mesh controller an indication of an inability to assess compliance of a given node to one or more rules of the mesh membership contract. The indication may be deemed by a mesh controller as an unresolved mesh membership contract compliance for the given node. In some aspects, the indication may be accompanied by the given node's response to a request for performance status. The request for performance status may be performed by nodes when routinely monitoring one another's compliance to rules of the mesh membership contract.

Thus, the mesh controller may determine, whether it has received a report of an unresolved membership contract compliance for any nodes in the mesh network (block 324). This determination may be performed after, concurrently with, or prior to determining whether the mesh controller has received notification of a node having a deficient performance metric (block 312). If there is an unresolved mesh membership contract compliance for a node, the mesh controller may assess the device parameters (e.g., performance metrics and configuration parameters) of the given node (block 326). In some aspects, such assessment may be performed or caused to be performed by NRS server 108 (e.g., via NRS application 104). The mesh controller and/or the NRS server may possess (e.g., in memory) requisite performance metrics and/or requisite configuration parameters required by all rules of the mesh membership contract. Furthermore, the mesh controller and/or the NRS server may be able to decrypt, decode, and/or read data and metadata for node devices of all capabilities, e.g., to determine whether a given node device is compliant with a rule of the mesh membership contract (or, to the contrary, found to be deficient).

Thus, at block 328, the mesh controller and/or the NRS server may determine whether the node is found to be deficient based on the assessment of the node's compliance to the mesh membership contract. If the device is found to be deficient, the mesh controller may proceed with one or more processes for blocks 318 through 322, as previously described. If the node is not found to be deficient, the mesh controller may continue performing the above described iterative monitoring processes (e.g., blocks 302 through 324).

Figure 4:
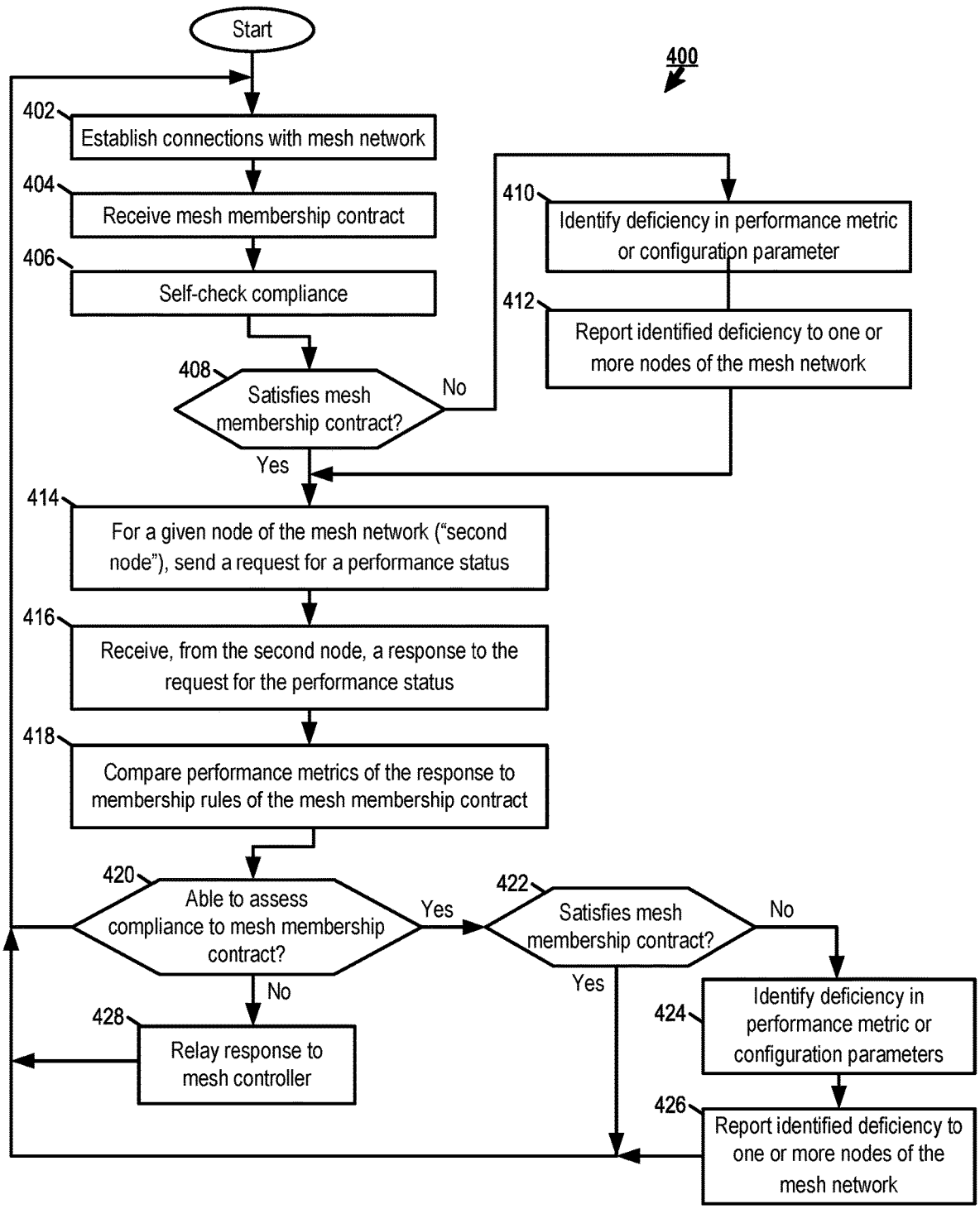
FIG. 4 illustrates a flowchart of another example process performed by an individual node of a mesh network to facilitate consensus-based node retirement, according to an example embodiment of the present disclosure.

FIG. 4 illustrates a flowchart of another example process 400 performed by an individual node (e.g., node 116) of a mesh network to facilitate consensus-based node retirement, according to an example embodiment of the present disclosure. For ease of explanation, the individual node may be referred to as "first node," in order to distinguish from other nodes (e.g., "second node") of the mesh network.

It is to be appreciated that a mesh network may evolve (e.g., expand) by adding new nodes (e.g., a computing system, a server, a client device, and/or a storage device) to the mesh network. Blocks 402 and 404 demonstrate an example of initiation processes involved with adding a new node to the mesh network. For example, at block 402, the new node (e.g., first node) may establish connections with the mesh network. In one aspect, establishing the communications may involve detecting the mesh network, and sending a request to another node device (e.g., mesh controller 102, nodes 110-116, etc.) of the mesh network to join the mesh network. The request may be processed by receiving device information of the new node and sending a mesh membership contract to the new node. As previously discussed, the mesh membership contract may set the terms for membership into the mesh network, and the new node may be required to check to see that it complies with the rules set forth in the mesh membership contract.

Thus, at block 404, the new node may receive the mesh membership contract (e.g., mesh membership contract 106). The device representing the new node may store the mesh membership contract may be stored in a memory associated with the device (e.g., in hard disk or cloud storage). Also or alternatively, the new node may be required to, and may access the mesh membership contract that may be stored in a storage associated with the mesh controller 102 and/or the NRS server 108. The new node may self-check its device parameters (e.g., performance metrics and configuration parameters) (block 406) to determine whether it satisfied the rules of the mesh membership contract (block 408). Satisfying the rules may grant entry of the new node into the mesh network. As part of the mesh network, the new node may be referred to as first node for ease of explanation.

In some aspects, the first node (and other nodes of the mesh network) may periodically monitor itself for compliance with the mesh membership contract (block 408), as performance metrics for various capabilities may degrade over time. If a performance metric does not satisfy a required performance metric of a performance rule of the mesh membership contract, the first node may identify its deficiency in the performance metric (block 410) and may report this deficiency to one or more nodes of the mesh network (block 412). As previously discussed, in relation to FIG. 3, the one or more nodes may vote (e.g., approve or disapprove) on the first node's identified deficiency of itself in complying with the performance rule. For example, the one or more nodes may be provided with a report of the performance metrics or configuration parameters of the first node, and may compare them to the membership rules (e.g., performance rules and/or non-performance based rules) of the mesh membership contract. The votes may be sent to the mesh controller. The mesh controller may deem that there is a consensus that the first node is deficient if a majority (or a threshold proportion) of the nodes of the mesh network approve the deficiency of the first node. The mesh controller may proceed with retirement of the first node or one or more capabilities of the first node according to processes previously described in FIG. 3. In some embodiments, the one or more nodes to which the deficiency is reported may include the mesh controller.

The first node, like other nodes of the mesh network, may also actively monitor one another to ensure compliance with the mesh membership contract. The active monitoring may be performed to neighboring nodes, all other nodes, and/or nodes with which the first node interacts with. Furthermore, the active monitoring may be performed as a novel and nonobvious addition to routine operations typically performed by nodes of a mesh network (e.g., handshaking protocol communications, etc.). For example, for a given node of the mesh network ("second node"), the first node may send a request for a performance status (block 414). Thereafter, the first node may receive, from the second node, a response to the request for the performance status (block 416). Blocks 414 and 416 may be similar to blocks 202 and 204, as previously described in relation to FIG. 2.

At block 418, the first node may compare the performance metrics of the response to membership rules of the membership contract. As previously discussed in relation to FIG. 2, the response from the second node may comprise a report displaying current performance metrics of the second node for various performance-based rules of the mesh membership contract along with configuration parameters of the second node (e.g., hardware specifications and non-performance-based metrics) for various non-performance-based rules of the mesh membership contract. The first node may review the performance metrics measured by the second node, compare them with threshold performance metrics required by each performance rule of the mesh membership contract, and identify if the second node fails to comply with (i.e., is deficient in) any performance rule. To the extent that the first node shares capabilities with the second node, or to the extent that the first node is able to read, recognize, and/or decode configuration parameters provided by the second node, the first node may also compare configuration parameters provided by the second node to required configuration parameters of various non-performance rules of the mesh membership contract.

However, the first node may not necessarily have the ability to assess the compliance of the second node with every membership rule. For example, the first node may not necessarily be able to assess compliance with requirements for the second node to possess a specific hardware or a requirement to receive, generate, or transmit metadata not accessible or decipherable to the first node. As another example, if the first node and second node are used in the mesh network for different capabilities (e.g., where the first node is used for storage and the second node is used as a communication beacon), the second node may generate performance metrics that may not be readable or recognizable to the first node. Thus, at block 420, the first node may determine whether it is able to assess the second node's compliance to the mesh membership contract. If the first node is not able to (e.g., for the aforementioned reasons), the first node may relay the second node's response to the request for performance status to the mesh controller. The mesh controller may assess whether the second node is deficient with respect to the unresolved compliance determination, e.g., as described in blocks 324 through 328 in FIG. 3.

If the first node is able to assess the compliance of the second node to the mesh membership contract, the first node may determine whether the second node satisfies the mesh membership contract (block 422). For example, the first node may use the comparison from block 418 to identify any deficiencies with required performance metrics or configuration parameters (block 424). The identified deficiencies may then be reported to one or more nodes of the mesh network (block 426). The one or more nodes may vote (e.g., approve or disapprove) on the first node's identified deficiency of the second node in complying with a membership rule. For example, the one or more nodes may be provided with the report of the performance metrics and configuration parameters of the second node, and may compare them to performance-based rules and/or non-performance based rules of the mesh membership contract. The votes may be sent to the mesh controller. The mesh controller may deem that there is a consensus that the second node is deficient if a majority (or a threshold proportion) of the nodes of the mesh network approve the deficiency of the second node. The mesh controller may proceed with retirement of the second node or one or more capabilities of the second node according to processes previously described in FIG. 3. In some embodiments, the one or more nodes to which the deficiency is reported may include the mesh controller.

Figure 5:
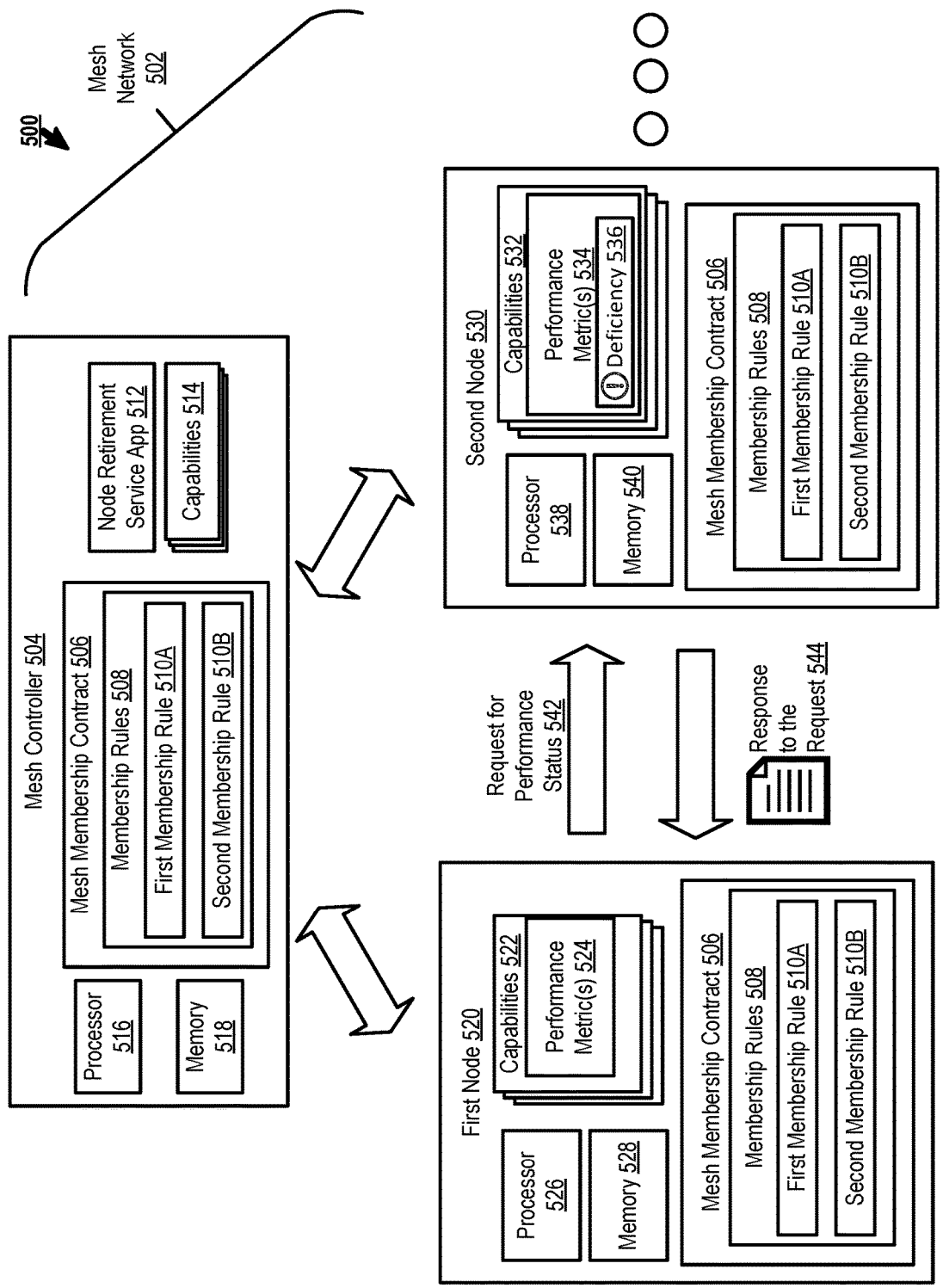
FIG. 5 illustrates a block diagram of an example computing system for a mesh network involved in consensus-based node retirement, according to an example embodiment of the present disclosure.

FIG. 5 illustrates a block diagram of an example system 500 for a mesh network 502 involved in consensus-based node retirement, according to an example embodiment of the present disclosure. The system 500 may comprise a mesh network 502 comprising a plurality of nodes (e.g., a first node 520, a second node 530), and a mesh controller 504. The system may further include one or more processors (e.g., processor 516, processor 526, processor 538, etc.) and memory (e.g., memory 518, memory 528, memory 540, etc.). One or more of the memory may store instructions that, when executed by the one or more processors, cause the first node 520 to send, to the second node 530, a request for a performance status 542; and receive, from the second node 530, a response to the request for the performance status 544. The instructions, when executed, by the one or more processors, may cause the first node 520 to identify, based on the response to the request for the performance status 544, a deficiency 536 in a performance metric 534 of the second node 530. The deficiency 536 may be based on a failure of the performance metric 534 of the second node 530 to satisfy a first membership rule 510A of a mesh membership contract 506. As shown in FIG. 5, the mesh membership contract 506 may be accessible to the plurality of nodes. The mesh membership contract 506 may include a plurality of membership rules 508, including the first membership rule 510A and a second membership rule 510B.

The instructions, when executed, by the one or more processors, may cause the first node 520 to cause, after a consensus by the mesh network 502 for the identified deficiency 536 in the performance metric 534 of the second node 530, a removal of one or more capabilities 532 of the second node 530 from the mesh network 502. As shown in FIG. 5, each node and/or mesh controller 504 of the mesh network 502 may have a unique set of capabilities that may or may not overlap (e.g., capabilities 514, 522, and 532).

In some embodiments, the instructions, when executed, may cause the first node 520 to determine, based on the response to the request for the performance status 544, an inability to assess compliance of the second node 530 to the second membership rule 510B of the mesh membership contract. The instructions, when executed, may cause the first node 520 to report, to the mesh controller 504, the response to the request for the performance status 544 and the inability to assess compliance of the second node 530 to the second membership rule 510B.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
a mesh network comprising a plurality of nodes including a first node, a second node, and a mesh controller, wherein the mesh network is managed by the mesh controller;
one or more processors; and
memory storing instructions that, when executed by the one or more processors, cause the mesh controller to:
distribute a mesh membership contract to the mesh network, the mesh membership contract comprising a plurality of membership rules including a first membership rule;
receive, from the first node, based on a performance status of the second node, an identification of a deficiency in a performance metric of the second node, wherein the deficiency is based on a failure of the performance metric of the second node to satisfy the first membership rule of the mesh membership contract; and
remove, after a consensus by the mesh network for the identified deficiency in the performance metric of the second node, one or more capabilities of the second node from the mesh network.

2. The system of claim 1, wherein the performance status of the second node is prompted by a request from the first node for the performance status of the second node.

3. The system of claim 1, wherein the instructions, when executed, cause the mesh controller to remove the one or more capabilities of the second node from the mesh network by:
reporting, to at least a portion of the plurality of nodes, the identified deficiency in the performance metric of the second node; and
prompting at least the portion of the plurality of nodes to approve the identified deficiency in the performance metric of the second node.

4. The system of claim 3, wherein the instructions, when executed, cause the mesh controller to:
identify, based on an approval by at least the portion of the plurality of nodes on the identified deficiency in the performance metric of the second node, the consensus on the identified deficiency in the performance metric of the second node; and
remove, based on the identified deficiency and via a node retirement application associated with the mesh controller, the one or more capabilities of the second node from the mesh network.

5. The system of claim 1, wherein the instructions, when executed, cause the mesh controller to distribute the mesh membership contract prior to the first node identifying the deficiency in the performance metric of the second node.

6. The system of claim 1, wherein the instructions, when executed, further cause the mesh controller to:
receive a proposal to modify the mesh membership contract;
identify, from at least a second portion of the plurality of nodes, a consensus to modify the mesh membership contract; and
update, via the node retirement application and based on the proposal, the mesh membership contract.

7. The system of claim 1, wherein the instructions, when executed, further cause the mesh controller to:
receive, from the first node, based on a response from the second node to a request for a second performance status of the second node, an inability to assess compliance of the second node to a second membership rule of the mesh membership contract.

8. The system of claim 7, wherein the instructions, when executed, cause the mesh controller to:
identify, based on the second membership rule and the response to the request for the second performance status of the second node, a deficiency in a second performance metric of the second node.

9. The system of claim 1, wherein the one or more capabilities of the second node comprises one or more of:
a storage for the mesh network;
a communication beacon for the mesh network; or
a backup server for the mesh network.

10. A method comprising:
  distributing, by a mesh controller, a mesh membership contract to a mesh network managed by the mesh controller, the mesh network comprising a plurality of nodes including a first node and a second node, the mesh membership contract comprising a plurality of membership rules including a first membership rule;
  receiving, from the first node, based on a performance status of the second node, an identification of a deficiency in a performance metric of the second node, wherein the deficiency is based on a failure of the performance metric of the second node to satisfy the first membership rule of the mesh membership contract; and
  removing, after a consensus by the mesh network for the identified deficiency in the performance metric of the second node, one or more capabilities of the second node from the mesh network.

11. The method of claim 10, wherein the performance status of the second node is prompted by a request from the first node for the performance status of the second node.

12. The method of claim 10, wherein removing the one or more capabilities of the second node from the mesh network comprises:
  reporting, by the mesh controller to at least a portion of the plurality of nodes, the identified deficiency in the performance metric of the second node; and
  prompting at least the portion of the plurality of nodes to approve the identified deficiency in the performance metric of the second node.

13. The method of claim 10, further comprising:
  identifying, by the mesh controller, based on an approval by at least the portion of the plurality of nodes on the identified deficiency in the performance metric of the second node, the consensus on the identified deficiency in the performance metric of the second node; and
  removing, by the mesh controller, based on the identified deficiency and via a node retirement application associated with the mesh controller, the one or more capabilities of the second node from the mesh network.

14. The method of claim 10, wherein the mesh controller distributes the mesh membership contract prior to the first node identifying the deficiency in the performance metric of the second node.

15. The method of claim 10, further comprising:
  receiving, by the mesh controller, a proposal to modify the mesh membership contract;
  identifying, from at least a second portion of the plurality of nodes, a consensus to modify the mesh membership contract; and
  updating, by the mesh controller, via the node retirement application, and based on the proposal, the mesh membership contract.

16. The method of claim 10, further comprising:
  receiving, by the mesh controller, from the first node, and based on a response from the second node to a request for a second performance status of the second node, an inability to assess compliance of the second node to a second membership rule of the mesh membership contract.

17. The method of claim 16, further comprising:
  identifying, by the mesh controller, based on the second membership rule and the response to the request for the second performance status of the second node, a deficiency in a second performance metric of the second node.

18. The method of claim 10, wherein the one or more capabilities of the second node comprises one or more of:
  a storage for the mesh network;
  a communication beacon for the mesh network; or
  a backup server for the mesh network.

19. A non-transitory computer readable medium for use on a computer system containing computer-executable programming instructions for a consensus-based node retirement in a mesh network, the instructions comprising:
  distributing, by a mesh controller, a mesh membership contract to a mesh network managed by the mesh controller, the mesh network comprising a plurality of nodes including a first node and a second node, the mesh membership contract comprising a plurality of membership rules including a first membership rule;
  receiving, from the first node, based on a performance status of the second node, an identification of a deficiency in a performance metric of the second node, wherein the deficiency is based on a failure of the performance metric of the second node to satisfy the first membership rule of the mesh membership contract; and
  removing, after a consensus by the mesh network for the identified deficiency in the performance metric of the second node, one or more capabilities of the second node from the mesh network.

20. The non-transitory computer readable medium of claim 19, wherein removing the one or more capabilities of the second node from the mesh network comprises:
  reporting, by the mesh controller to at least a portion of the plurality of nodes, the identified deficiency in the performance metric of the second node; and
  prompting at least the portion of the plurality of nodes to approve the identified deficiency in the performance metric of the second node.

* * * * *